United States Patent
Wang

(10) Patent No.: US 11,160,031 B2
(45) Date of Patent: Oct. 26, 2021

(54) TRANSMISSION POWER CONTROL FOR WIRELESS COMMUNICATION SYSTEMS

(71) Applicant: SZ DJI TECHNOLOGY CO., LTD., Shenzhen (CN)

(72) Inventor: Xiaodong Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 94 days.

(21) Appl. No.: 16/601,074

(22) Filed: Oct. 14, 2019

(65) Prior Publication Data

US 2020/0045642 A1   Feb. 6, 2020

Related U.S. Application Data

(63) Continuation of application No. PCT/CN2017/081500, filed on Apr. 21, 2017.

(51) Int. Cl.
| | |
|---|---|
| *H04W 52/14* | (2009.01) |
| *H04B 17/336* | (2015.01) |
| *B64C 39/02* | (2006.01) |
| *H04W 4/02* | (2018.01) |
| *H04W 24/10* | (2009.01) |
| *H04W 52/24* | (2009.01) |
| *G01C 5/00* | (2006.01) |

(52) U.S. Cl.
CPC ......... *H04W 52/146* (2013.01); *B64C 39/024* (2013.01); *H04B 17/336* (2015.01); *H04W 4/027* (2013.01); *H04W 24/10* (2013.01); *H04W 52/242* (2013.01); *H04W 52/243* (2013.01); *G01C 5/00* (2013.01)

(58) Field of Classification Search
CPC .................................................. H04W 52/146
See application file for complete search history.

(56) References Cited

U.S. PATENT DOCUMENTS

| | | | | |
|---|---|---|---|---|
| 10,348,394 | B1* | 7/2019 | Bakr | H04B 7/0408 |
| 2012/0249356 | A1* | 10/2012 | Shope | G01S 13/04 |
| | | | | 342/22 |
| 2015/0304885 | A1* | 10/2015 | Jalali | H04B 17/336 |
| | | | | 370/329 |

(Continued)

FOREIGN PATENT DOCUMENTS

| | | |
|---|---|---|
| CN | 101075830 A | 11/2007 |
| CN | 101589561 A | 11/2009 |

(Continued)

OTHER PUBLICATIONS

The World Intellectual Property Organization (WIPO) International Search Report and Written Opinion for PCT/CN2017/081500 dated Jan. 19, 2018 6 pages.

*Primary Examiner* — Fahmida S Chowdhury
(74) *Attorney, Agent, or Firm* — Anova Law Group, PLLC

(57) ABSTRACT

A method of controlling a transmission power of a wireless communication device of a movable object includes determining a distance between the movable object and a target object located outside of the movable object, determining a transmission power level based on at least the determined distance between the movable object and the target object and a target signal-to-noise level for signals received at the target object, and transmitting signals from the movable object to the target object based on the determined transmission power level.

19 Claims, 8 Drawing Sheets

(56) References Cited

U.S. PATENT DOCUMENTS

| | | | | |
|---|---|---|---|---|
| 2016/0112116 A1* | 4/2016 | Jalali | ............ | H04W 72/085 |
| | | | | 370/252 |
| 2016/0327950 A1* | 11/2016 | Bachrach | ............ | B64C 39/024 |
| 2017/0325221 A1* | 11/2017 | Jalali | ............ | H01Q 1/28 |
| 2018/0046187 A1* | 2/2018 | Martirosyan | ............ | G05D 1/106 |
| 2018/0059659 A1* | 3/2018 | Takeuchi | ............ | G06Q 10/083 |
| 2019/0012636 A1* | 1/2019 | Simon | ............ | G08G 5/006 |

FOREIGN PATENT DOCUMENTS

| | | | |
|---|---|---|---|
| CN | 101707494 | A | 5/2010 |
| CN | 101729104 | A | 6/2010 |
| CN | 102687415 | A | 9/2012 |
| CN | 103561103 | A | 2/2014 |
| CN | 104144483 | A | 11/2014 |
| CN | 105282833 | A | 1/2016 |
| CN | 105657809 | A | 6/2016 |
| CN | 106059840 | A | 10/2016 |
| CN | 106535308 | A | 3/2017 |

\* cited by examiner

TRANSMISSION POWER CONTROL FOR WIRELESS COMMUNICATION SYSTEMS

CROSS-REFERENCE TO RELATED APPLICATION

This application is a continuation of International Application No. PCT/CN2017/081500, filed Apr. 21, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to wireless communication and, more particularly, to systems and methods for controlling a transmission power of a wireless communication device in a movable object, such as an unmanned aerial vehicle.

BACKGROUND

Unmanned aerial vehicles (UAVs), sometimes referred to as "drones," may be configured to carry a payload, such as cargo, optical equipment (e.g., photo cameras, video cameras, etc.), sensory equipment, or other types of payload. UAVs are recognized in many industries and in many situations as useful tools for relieving personnel of the responsibility for directly performing certain tasks. For instance, UAVs have been used to deliver cargo, conduct surveillance, and collect various types of imaging and sensory data (e.g., photo, video, ultrasonic, infrared, etc.) in professional and recreational settings, providing flexibility and enhancement of human capabilities.

For example, in professional photography, filmography, and videography, UAVs may be equipped with imaging devices and used to capture footage from stationary and/or moving perspectives that may be otherwise too challenging for personnel to capture. Additionally, UAVs may be equipped to collect imaging data over a certain period of time or for the duration of travel from one location to another. In these circumstances, the UAV may be required to collect imaging data and continuously or periodically transmit the data to another device.

Data gathered by UAVs equipped with optical or other sensory equipment may sometimes be communicated (e.g., transmitted) to other devices for processing, analysis, storage, dissemination, manipulation, etc. Data communication between UAVs and other devices may be carried out via a wireless communication network, such as a cellular network, a wireless local area network (WLAN) network, or using a particular wireless protocol, such as IEEE 802.15.1, IEEE 802.11, and/or other communication protocols. In this context, a wireless communication network includes "nodes" that are capable of communicating with each other over the wireless network. The nodes may include various types of objects, including but not limited to UAVs, handheld devices, controllers, tablets, smartphones, computer systems, embedded systems, or any other movable or stationary device.

UAVs equipped with wireless communication systems for transmitting data are also typically equipped with a replaceable or rechargeable electric power source (e.g., one or more batteries) for powering the wireless communication system. In many instances, the same power source used for powering multiple functions and/or equipment of the UAV, such as the UAV's propulsion devices (e.g., motor driven propellers), electronic control system, lighting system, and/or auxiliary equipment (e.g., camera systems, sensory systems etc.). Thus, the amount of time and the distance over which the UAV can be operated before the power source must be recharged or replaced can be affected by the aggregate and individual power efficiencies of each system and device associated with the UAV.

For example, to ensure wireless communication signals are effectively transmitted with sufficient signal power to ensure an acceptable signal quality at the receiver, UAV wireless communication systems typically transmit signals using a maximum possible transmission power level. By constantly transmitting signals using the maximum transmission power level, such UAVs may offset various factors that can reduce wireless signal quality at the receiver, such as environmental conditions, transmission frequency limitations, intervening obstacles, distance between transmitting and receiving devices, and/or other factors, regardless of whether such factors are significantly diminishing the signal quality at the receiver. In these conventional systems, the UAV's power source can be depleted more rapidly than necessary, requiring the power source to be replenished or replaced frequently. Furthermore, by constantly transmitting signals using the maximum transmission power level, use of conventional systems can result in increased interference with other wireless communication devices nearby.

SUMMARY

In one embodiment, the present disclosure relates to a method of controlling a transmission power of a wireless communication device in a movable object. The method may include determining a distance between the movable object and a target object located outside of the movable object, determining a transmission power level based on at least the determined distance between the movable object and the target object and a target signal-to-noise level for signals received at the target object, and transmitting signals from the movable object to the target object based on the determined transmission power level.

In another embodiment, the present disclosure relates to a system for controlling a transmission power of a wireless communication device of a movable object. The system may include a memory having instructions stored therein and an electronic control unit having a processor. The processor may be configured to execute the instructions to determine a distance between the movable object and a target object located outside of the movable object, determine a transmission power level based on at least the determined distance between the movable object and the target object and a target signal-to-noise level for signals received at the target object, and transmit signals from the movable object to the target object based on the determined transmission power level.

In yet another embodiment, the present disclosure relates to an unmanned aerial vehicle (UAV). The UAV may include a propulsion device, a communication device, a power storage device configured to power the propulsion device and the communication device, a memory storing instructions, and an electronic control unit in communication with the communication device and configured to control a transmission power of the communication device. The controller may include a processor configured to execute the instructions to determine a distance between the movable object and a target object located outside of the movable object, determine a transmission power level based on at least the determined distance between the movable object and the target object and a target signal-to-noise level for signals received at the target object, and transmit signals from the movable object to the target object based on the determined transmission power level.

In yet another embodiment, the present disclosure relates to a non-transitory computer-readable medium storing instructions, that, when executed, cause a computer to perform a method of controlling a transmission power of a wireless communication device in a movable object. The method may include determining a distance between the movable object and a target object located outside of the movable object, determining a transmission power level based on at least the determined distance between the movable object and the target object and a target signal-to-noise level for signals received at the target object, and transmitting signals from the movable object to the target object based on the determined transmission power level.

DETAILED DESCRIPTION

Figure 1:
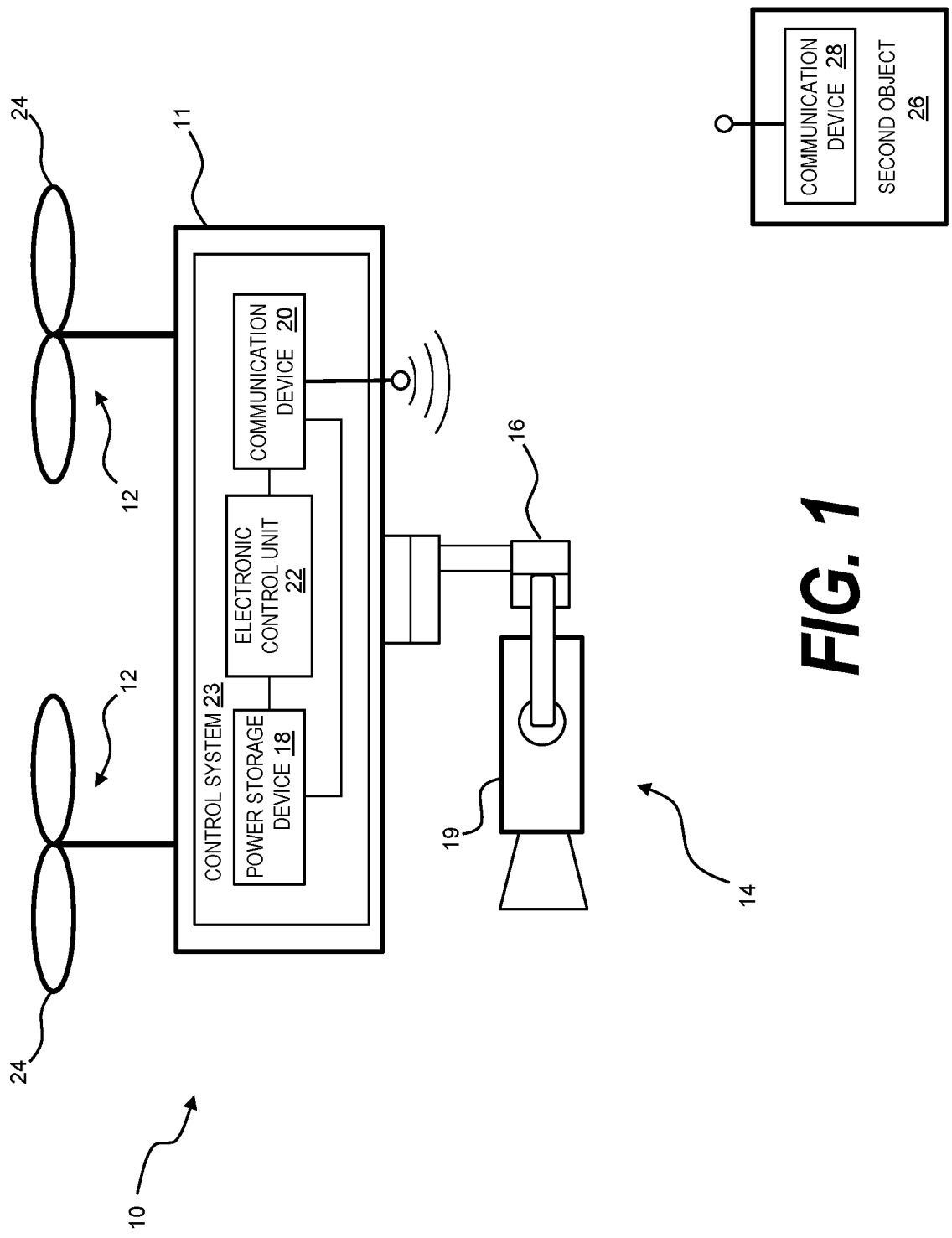
FIG. 1 is a schematic diagram of an exemplary movable object configured to communicate with an exemplary second object that may be used in accordance with the illustrative embodiments described herein.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows an exemplary movable object 10 that may be configured to move within an environment. Movable object 10 may be any suitable object, device, mechanism, system, or machine configured to travel on or within a suitable medium (e.g., a surface, air, water, one or more rails, space, underground, etc.). For example, movable object 10 may be an unmanned aerial vehicle (UAV). Although movable object 10 is shown and described herein as a UAV for exemplary purposes of this description, it is understood that other types of movable objects (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include a housing 11, one or more propulsion assemblies 12, and a payload 14, such as a camera or video system. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include a power storage device 18, a communication device 20, and an electronic control unit 22 in communication with the other components. In some embodiments, one or more of power storage device 18, communication device 20, and an electronic control unit 22 may be included in a control system 23. Control system 23 may be configured to control multiple systems or functions of movable object 10. Alternatively, control system 23 may be dedicated to controlling a single system or subset of functions. For example, control system 23 may be or include a flight control system of a UAV.

Movable object 10 may include one or more propulsion assemblies 12 positioned at various locations (for example, top, sides, front, rear, and/or bottom of movable object 10) for propelling and steering movable object 10. Although only two exemplary propulsion assemblies 12 are shown in FIG. 1, it will be appreciated that movable object 10 may include any number of propulsion assemblies (e.g., 1, 2, 3, 4, 5, 10, 15, 20, etc.). Propulsion assemblies 12 may be devices or systems operable to generate forces for sustaining controlled flight. Propulsion assemblies 12 may share or may each separately include at least one power source, such as one or more batteries, fuel cells, solar cells, etc., or combinations thereof. Each propulsion assembly 12 may also include one or more rotary components 24, e.g., within an electric motor, engine, or turbine, coupled to the power source and configured to participate in the generation of forces for sustaining controlled flight. For instance, rotary components 24 may include rotors, propellers, blades, etc., which may be driven on or by a shaft, axle, wheel, or other component or system configured to transfer power from the power source. Propulsion assemblies 12 and/or rotary components 24 may be adjustable (e.g., tiltable) with respect to each other and/or with respect to movable object 10. Alternatively, propulsion assemblies 12 and rotary components 24 may have a fixed orientation with respect to each other and/or movable object 10. In some embodiments, each propulsion assembly 12 may be of the same type. In other embodiments, propulsion assemblies 12 may be of multiple different types. In some embodiments, all propulsion assemblies 12 may be controlled in concert (e.g., all at the same speed and/or angle). In other embodiments, one or more propulsion devices may be independently controlled with respect to, e.g., speed and/or angle.

Propulsion assemblies 12 may be configured to propel movable object 10 in one or more vertical and horizontal directions and to allow movable object 10 to rotate about one or more axes. That is, propulsion assemblies 12 may be configured to provide lift and/or thrust for creating and maintaining translational and rotational movements of movable object 10. For instance, propulsion assemblies 12 may be configured to enable movable object 10 to achieve and maintain desired altitudes, provide thrust for movement in all directions, and provide for steering of movable object 10. In some embodiments, propulsion assemblies 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion assemblies 12 may be configured to enable movement of movable object 10 along and/or about multiple axes.

Payload 14 may include one or more sensory devices 19, such as the exemplary sensory device 19 shown in FIG. 1. Sensory devices 19 may include devices for collecting or generating data or information, such as surveying, tracking, and capturing images or video of targets (e.g., objects, landscapes, subjects of photo or video shoots, etc.). Sensory devices 19 may include imaging devices configured to gathering data that may be used to generate images. For example, imaging devices may include photographic cameras (e.g., analog, digital, etc.), video cameras, infrared imaging devices, ultraviolet imaging devices, x-ray devices, ultrasonic imaging devices, radar devices, binocular cameras, etc. Sensory devices 19 may also or alternatively include devices for capturing audio data, such as microphones or ultrasound detectors. Sensory devices 19 may also or alternatively include other suitable sensors for capturing visual, audio, and/or electromagnetic signals.

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, ≤30°, ≤15° etc.), about one or more of its axes.

Communication device 20 may be configured to enable communications of data, information, commands (e.g., flight commands, commands for operating payload 14, etc.), and/or other types of signals between electronic control unit 22 and off-board entities. Communication device 20 may include one or more components configured to send and/or receive signals, such as receivers, transmitters, or transceivers that are configured to carry out one- or two-way communication. Components of communication device 20 may be configured to communicate with off-board entities via one or more communication networks, such as networks configured for WLAN, radio, cellular (e.g., WCDMA, LTE, etc.), WiFi, RFID, etc., and using one or more wireless communication protocols (e.g., IEEE 802.15.1, IEEE 802.11, etc.), and/or other types of communication networks or protocols usable to transmit signals indicative of data, information, commands, control, and/or other signals. Communication device 20 may be configured to enable communications with user input devices, such as a control terminal (e.g., a remote control) or other stationary, mobile, or handheld control device, that provide user input for controlling movable object 10 during flight. For example, communication device 20 may be configured to communicate with a second object 26 (also referred to as a "communication target object" or simply "target object"), which may be a user input device or any other device capable of receiving and/or transmitting signals with movable object 10.

Second object 26 may be a stationary device, mobile device, or other type of device configured to communicate with movable object 10 via communication device 20. For example, in some embodiments the second object 26 may be another movable device (e.g., another UAV), a computer, a terminal, a user input device (e.g., a remote control device), etc. Second object 26 may include a communication device 28 configured to enable wireless communication with movable object 10 (e.g., with communication device 20) or other objects. Communication device 28 may be configured to receive data and information from communication device 20, such as operational data relating to, for example, positional data, velocity data, acceleration data, sensory data (e.g., imaging data), and other data and information relating to movable object 10, its components, and/or its surrounding environment. In some embodiments, second object 26 may include control features, such as levers, buttons, touch screen device, displays, etc. In some embodiments, second object 26 may embody an electronic communication device, such as a smartphone or a tablet, with virtual control features (e.g., graphical user interfaces, applications, etc.).

Figure 2:
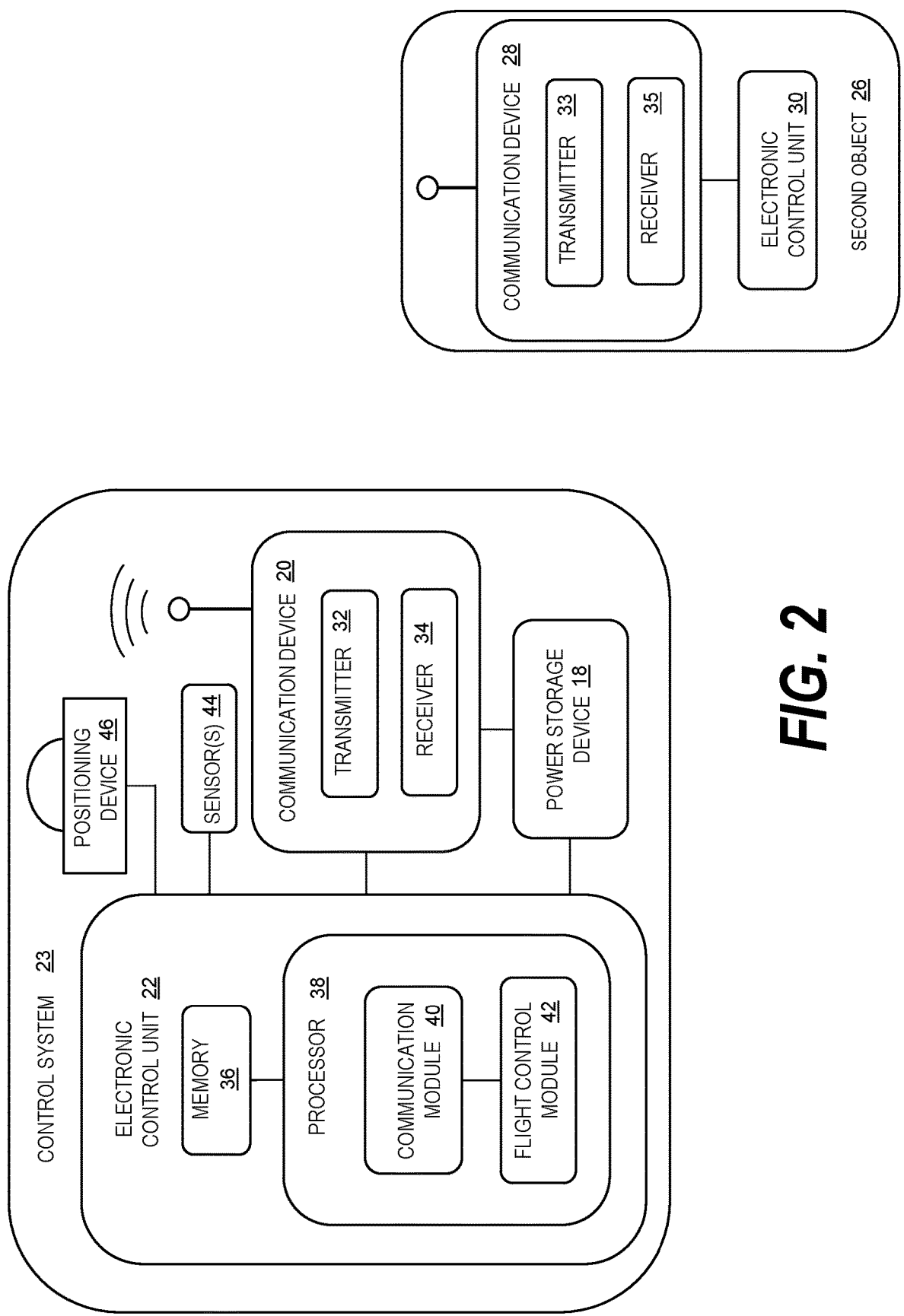
FIG. 2 shows schematic diagrams of exemplary control systems that may be used with the movable object and second object of FIG. 1.

FIG. 2 is a schematic block diagram of control system 23 and second object 26, consistent with the exemplary embodiments of this disclosure. Control system 23 may include power storage device 18, communication device 20, and electronic control unit 22, among other things. Second object 26 may include, inter alia, a communication device 28 and an electronic control unit 30.

Power storage device 18 may be a device configured to energize or otherwise supply power to electronic components, mechanical components, or combinations thereof in the movable object 10. For example, power storage device 18 may be a battery, a battery bank, or other device. In other embodiments, power storage device 18 may be or include one or more of a combustible fuel, a fuel cell, or another type of power storage device.

Communication device 20 may be an electronic device configured to enable wireless communication with other devices. For example, communication device 20 may include a transmitter 32, a receiver 34, circuitry, and/or other components. Transmitter 32 and receiver 34 may be electronic components respectively configured to transmit and receive wireless communication signals. In some embodiments, transmitter 32 and receiver 34 may be separate devices or structures. In other embodiments, transmitter 32 and receiver 34 may be combined (or their respective functions may be combined) in a single transceiver device configured to send (i.e., transmit) and receive wireless communication signals. Wireless communication signals may include any type of electromagnetic signal encoded with or otherwise indicative of data or information. Transmitter 32 and receiver 34 may be connected to one or more shared antennas, such as the exemplary antenna in FIG. 2, or may transmit and receive using separate antennas or antenna arrays in the movable object 10.

Communication device 20 may be configured to transmit and/or receive data from one or more other devices via suitable means of communication usable to transfer data and information to or from electronic control unit 22. For example, communication device 20 may be configured to utilize one or more local area networks (LAN), wide area networks (WAN), infrared systems, radio systems, Wi-Fi networks, point-to-point (P2P) networks, cellular networks, satellite networks, and the like. Optionally, relay stations, such as towers, satellites, or mobile stations, can be used, as well as any other intermediate nodes that facilitate communications between the movable object 10 and second objet 26. Wireless communications can be proximity dependent or proximity independent. In some embodiments, line-of-sight may or may not be required for communications.

Electronic control unit 22 may include one or more components, including, for example, a memory 36 and at least one processor 38. Memory 36 may be or include non-transitory computer-readable media and can include one or more memory units of non-transitory computer-readable media. Non-transitory computer-readable media of memory 36 may be or include any type of disk including floppy disks, hard disks, optical discs, DVDs, CD-ROMs, microdrive, magneto-optical disks, ROMs, RAMs, EPROMs, EEPROMs, DRAMs, VRAMs, flash memory devices, magnetic or optical cards, nanosystems (including molecular memory integrated circuits), or any type of media or device suitable for storing instructions and/or data. Memory units may include permanent and/or removable portions of non-transitory computer-readable media (e.g., removable media or external storage, such as an SD card, RAM, etc.).

Information and data from sensory devices 19 and/or other devices may be communicated to and stored in non-transitory computer-readable media of memory 36. Non-transitory computer-readable media associated with memory 36 may also be configured to store logic, code and/or program instructions executable by processor 38 to perform any of the illustrative embodiments described herein. For example, non-transitory computer-readable media associated with memory 36 may be configured to store computer-readable instructions that, when executed by processor 38, cause the processor to perform a method comprising one or more steps. The method performed by processor 38 based on the instructions stored in non-transitory computer readable media of memory 36 may involve processing inputs, such as inputs of data or information stored in the non-transitory computer-readable media of memory 36, inputs received from second object 26, inputs received from sensory devices 19, and/or other inputs received via communication device 20. The non-transitory computer-readable media may be configured to store data obtained or derived from sensory devices 19 to be processed by processor 38 and/or by second object 26 (e.g., via electronic control unit 30). In some embodiments, the non-transitory computer-readable media can be used to store the processing results produced by processor 38.

Processor 38 may include one or more processors and may embody a programmable processor (e.g., a central processing unit (CPU)). Processor 38 may be operatively coupled to memory 36 or another memory device configured to store programs or instructions executable by processor 38 for performing one or more method steps. It is noted that method steps described herein may be embodied by one or more instructions and data stored in memory 36 and that cause the method steps to be carried out when processed by the processor 38.

In some embodiments, processor 38 may include and/or alternatively may be operatively coupled to one or more control modules, such as a communication module 40 and a flight control module 42 in the illustrative embodiment of FIG. 2, as described further below. Communication module 40 may be configured to help control aspects of wireless communication between movable object 10 and other objects (e.g., second object 26), such as a transmission power level of communication device 20. Flight module 42 may be configured to help control propulsion assemblies 12 of movable object 10 to adjust the position, orientation, velocity, and/or acceleration of movable object 10 during flight. Communication module 40 and flight control module 42 may be implemented in software for execution on processor 38, or may be implemented in hardware and/or software components at least partially included in, or separate from, the processor 38. For example, communication module 40 and flight control module 42 may include one or more CPUs, ASICs, DSPs, FPGAs, logic circuitry, etc. configured to implement their respective functions, or may share processing resources in processor 38. As used herein, the term "configured to" should be understood to include hardware configurations, software configurations (e.g., programming), and combinations thereof, including when used in conjunction with or to describe any controller, electronic control unit, or module described herein.

The components of electronic control unit 22 can be arranged in any suitable configuration. For example, one or more of the components of the electronic control unit 22 can be located on movable object 10, carrier 16, payload 14, second object 26, sensory device 19, or an additional external device in communication with one or more of the above. In some embodiments, one or more processors or memory devices can be situated at different locations, such as on the movable object 10, carrier 16, payload 14, second object 26, sensory device 19, or on an additional external device in communication with one or more of the above, or suitable combinations thereof, such that any suitable aspect of the processing and/or memory functions performed by the system can occur at one or more of the aforementioned locations.

Second object 26 may include the same or similar components as control system 23 in structure and/or function. For example, communication device 28 of second object 26 may include a transmitter 33 and a receiver 35. Transmitter 33 and receiver 35 may be the same or similar to transmitter 32 and receiver 34, respectively, in structure and/or function and therefore will not be described in detail. Electronic control unit 30 of second object 26 may be the same or similar to electronic control unit 22 in structure (e.g., may include memory, a processor, modules, etc.) and/or function and therefore will not be described in detail.

Control system 23 may receive information ("flight status information" or "status information") relating to flight parameters of movable object 10. The status information may include information indicative of at least one of a movement or a position of the movable object, for example, while the movable object 10 is in flight or at rest. For example, the status information may include one or more of a speed, an acceleration, a heading, a height (e.g., height above ground, altitude, etc.) of movable object 10, or a distance between the movable object 10 and other objects (e.g., second object 26) but is not limited thereto and may include other or additional information. Status information may be detected or collected via one or more sensors 44 included in, connected to, or otherwise associated with control system 23. For simplicity, only one exemplary sensor 44 is shown in FIG. 2. At least one sensor 44 may be included in the sensory devices 19. Sensors 44 may include, for example, gyroscopes, accelerometers, pressure sensors (e.g., absolute pressure sensors, differential pressure sensors, etc.), and one or more (e.g., a plurality of) distance sensors, which may include one or more cameras, infrared devices, ultraviolet devices, x-ray devices, ultrasonic devices, radar devices, laser devices, and devices associate with a positioning system (e.g., a global positioning system (GPS), GLONASS, Galileo, Beidou, GAGAN, GNSS, etc.). Distance sensors may be configured to generate signals indicative of a distance between itself and other objects (e.g., second object 26), the ground, etc. Sensors 44 may include other or additional sensors, such as temperature sensors (e.g., thermometers, thermocouples, etc.), motion sensors, inertial measurement sensors, proximity sensors, image sensors, etc.

Figure 3:
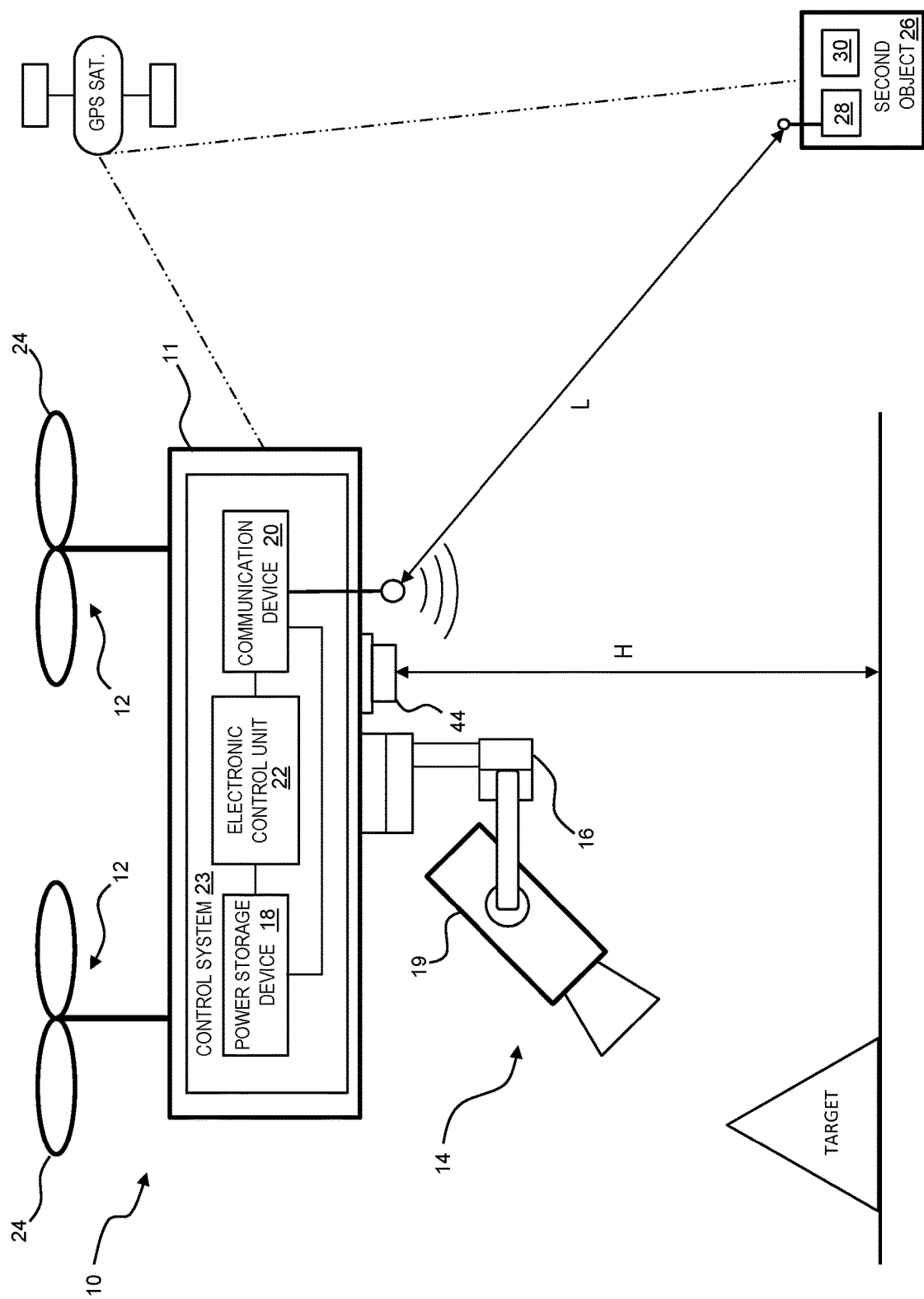
FIG. 3 is a schematic diagram of a system for controlling a transmission power of a wireless communication device of a movable object that may be used in accordance with an illustrative embodiment.

With reference to FIGS. 2 and 3, flight control module 42 may be configured to analyze data to determine distance information (e.g., may include a distance analysis module) or otherwise may be configured to determine a distance L of movable object 10 with respect to second object 26 and/or a height H of movable object 10 with respect to the ground based on input received from sensors 44 and/or other devices. For example, flight control module 42 may be configured to receive positioning information from a positioning device, such as a GPS device 46 or a device operable with another positioning system (e.g., GLONASS, Galileo, Beidou, GAGAN, GNSS, etc.), and use the positioning information, alone or in conjunction with information obtained from sensors 44, to determine the distance L between movable object 10 and second object 26. In some embodiments, positioning information from GPS device 46 may include locational coordinates of movable object 10 and/or second object 26. In other embodiments, the location of movable object 10 or second object 26 may be known and stored within memory associated with either of electronic control devices 22 and 30. Flight control module 42 may be configured to determine the distance L between movable object 10 and second object 26 based on the locations of movable object 10 and second object 26.

In some embodiments, flight control module 42 may be configured to determine the distance L between movable object 10 and second object 26 based further or alternatively on the height H of movable object 10. The height H of movable object 10 may be determined based on one or more measurements from sensors 44 (e.g., determined from measurements of one sensor). In other embodiments, flight control module 42 may be configured to determine the height H of movable object 10 based on an analysis of multiple height measurements (e.g., determined using multiple sensors 44, including sensors of different types) and/or other data. In some embodiments, flight control module 42 may be configured to determine the height H of movable object 10 based on measurements from different height sensors at different height ranges above the ground. For example, a first sensor (e.g., an ultrasonic sensor, a laser sensor, etc.) may be used over a first height range, a second height sensor (e.g., a single-lens or binocular camera) may be used over a second height range, and a third sensor (e.g., a pressure sensor) may be used over a third height range. Measurements from each sensor may be combined or otherwise used together to determine the height H of movable object 10. Flight control module 42 may also be configured to use the height H of movable object 10 alone or in conjunction with positional information from GPS device 46 to determine the distance L between movable object 10 and second object 26 (e.g., based on the Pythagorean theorem, triangulation, etc.).

To conserve energy and reduce signal interference with other objects, communication module 40 may be configured to determine a transmission power level for transmitting signals from movable object 10 (e.g., via transmitter 32) to another object (e.g., second object 26) based on at least a distance (e.g., the distance L) between movable object 10 and the other object (e.g., second object 26) and a target signal-to-noise level (e.g., a desired signal-to-noise ratio) for signals received at the other object. For example, transmitter 32 may be configured to generate communication signals between a maximum transmission power level and a minimum transmission power level. In many situations, transmitting signals below the maximum transmission power level is sufficient for generating signals that can be received at the other object with at least a minimum acceptable quality. The required transmission power level for signals of at least the minimum quality to reach the other object may depend on several factors, including but not limited to environmental factors, the presence of obstructions, and the distance between the transmitting and receiving devices. These several factors can result in "path loss" (signal attenuation) that causes a power level reduction of a signal between its generation at a transmitter and its reception by a receiver.

For many scenarios, path loss between a first object (e.g., transmitter 32 of movable object 10) and another object (e.g., receiver 35 of second object 26) for signals traveling through air may be referred to as "free space path loss" or "$PL_{free\ space}$" and may be calculated as follows:

$$PL_{free\ space} = 32.45 + 20 \log f(\text{MHz}) + 20 \log L(\text{km}) \quad \text{EQ 1}$$

In EQ 1 above, f is the frequency of transmission and L is the distance between movable object 10 and second object 26. Thus, free-space path loss depends on both the transmitted signal frequency (e.g., frequency of a carrier signal) and the distance between the transmitting object (transmitting node) and receiving object (receiving node). However, in many real world scenarios, other environmental factors, such as specific air or atmospheric conditions, physical obstructions, the presence of reflective or absorbing objects, and other factors, can increase the path loss between movable object 10 and second object 26. To account for such factors, a loss constant Δ may be determined through empirical testing and combined with $PL_{free\ space}$ to determine a total path loss $PL_{total}$, as shown in EQ 2 below.

$$PL_{total} = PL_{free\ space} + \Delta \quad \text{EQ 2}$$

The loss constant Δ may be determined by measuring path loss (e.g., by comparing a transmission power level at a transmitting object with a measured power level at a receiving object) and comparing the measured path loss to the free-space path loss $PL_{free\ space}$ for different environmental operating conditions. One or more loss constants may be determined, each corresponding to certain identifiable environmental operating conditions. When multiple loss constants are available, e.g., each corresponding to different environmental conditions, a loss constant may be selected based on the current environmental operating conditions (e.g., as determined from measuring one or more conditions, or determined manually by a user). Based on the selected or calculated loss constant and the determined $PL_{free\ space}$ value, $PL_{total}$ can be calculated as the total path loss between movable object 10 and second object 26.

Communication module 40 may be configured to use the determined $PL_{free\ space}$ or $PL_{total}$ between movable object 10 and second object 26 to determine the transmission power level (PTX) needed to generate signals that will be received by the second object 26 at a desired signal quality. The quality of the signals received by second object 26 may depend on other factors, such a signal-to-noise ratio or bit error rate of signals received at second object 26. The signal-to-noise ratio (S/N) may represent a ratio of signal power ("S") to the level of background noise power of the signal received by second object 26 (e.g., at receiver 35). The background noise may include noise caused by environmental factors, such as thermal noise, atmospheric noise, noise or interference caused by other wireless communication devices, etc. The sum of the noise sources may be referred to as a noise floor, and the power of the noise floor at the signal receiver may be referred to as $P_{noise\ floor}$. $PL_{noise\ floor}$ may be correlated to temperature (e.g., ambient temperature) and therefore may be determined based on a measured temperature value.

Bit error rate (BLER) may reflect a number of bits received at the receiving node that were altered, for example, due to noise, interference, etc. The bit error rate may be the number of bit errors divided by the total number of bits transferred during a predetermined period of time or in a block of data. Based on a target S/N and target BLER ("$BLER_{target}$") that the transmitting node (e.g., movable object 10) determines for the receiving node (e.g., second object 26), for example based on a distance L from the receiving node and/or environmental conditions, the transmitting node can adjust (e.g., increase or decrease) its transmission power level to achieve a desired signal quality at the receiving node. For example, the transmitting node can adjust its transmission power PTX to achieve the desired signal-to-noise level S/N and/or desired bit error rate $BLER_{target}$ at the receiving node.

However, determining whether the transmission power at movable object 10 needs to be adjusted based on the actual S/N and BLER at second object 26 can be challenging or impossible without feedback communication from second object 26. That is, where feedback communication is not possible or not reliable between the transmitting and receiving nodes (e.g. "open loop" systems), comparing the actual S/N and BLER at the receiving node with the transmitting node's desired signal-to-noise ratio S/N and desired $BLER_{target}$, respectively, is not possible using conventional communication systems and techniques.

In accordance with the disclosed embodiments, to determine the transmission power level PTX for transmitting signals from movable object 10, so the transmitted signals are received at a desired signal quality at second object 26, without relying on feedback of the actual S/N or BLER received at second object 26, communication module 40 may be configured to determine PTX based on the distance L between movable object 10 and second object 26, as well as other information that may be measured or stored by movable object 10. For example, communication module may be configured to determine the transmission power PTX needed to achieve signal reception of a desired quality based on the above factors as follows:

$$PTX = P_{noise\ floor} + S + PL_{total} = P_{noise\ floor} + S + PL_{free\ space} + \Delta \quad \text{EQ 3}$$

As explained above, $P_{noise\ floor}$ may be determined based on a measured temperature value (e.g., via one or more sensors 44). The signal power S corresponding to the desired signal-to-noise ratio, as well as the loss factor A, may be predetermined and stored within movable object 10 (e.g., within memory 36). And $PL_{free\ space}$ may be determined based on a known transmission frequency f and the distance L between movable object 10 and second object 26 determined by flight control module 42. In this way, the transmission power PTX can be determined without requiring feedback communication from second object 26, enabling more reliable transmission power calculations, and reducing the need to transmit signals at the maximum transmission power level of transmitter 32. As a result, movable object 10 can achieve greater power efficiency, which can result in longer flying times (i.e., missions of greater duration and reaching farther distances).

Figure 4:
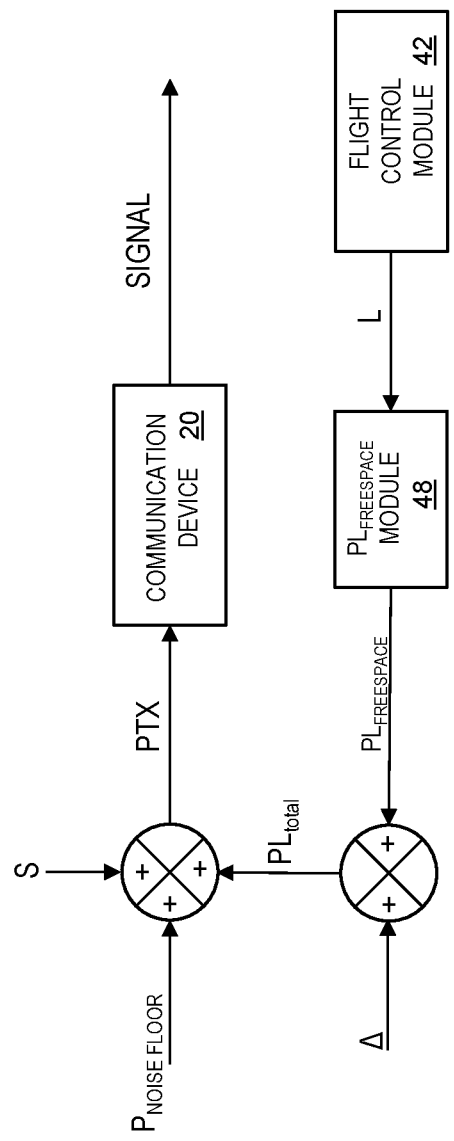
FIG. 4 shows a block diagram of an exemplary method of controlling a transmission power of a wireless communication device in a movable object that may be used in accordance with the illustrative embodiment of FIG. 3.

As shown in FIG. 4, flight control module 42 may output the determined distance L to another module, such as a $PL_{free\ space}$ module 48, for determining $PL_{free\ space}$. $PL_{free\ space}$ module 48 may be embodied in hardware and/or software, such as a processor included within electronic control module 22 or as computer-executable instructions stored within memory 36 and executable by processor 38 or its components. In some embodiments, $PL_{free\ space}$ and loss constant $\Delta$ may be combined (e.g., by addition) to determine $PL_{total}$. As explained above, $PL_{total}$, $P_{noise\ floor}$, and S may be combined (e.g., by addition) to determine the transmission power level PTX for transmitting signals from movable object 10 to second object 26. $PL_{total}$ and PTX may be calculated or otherwise determined by communication module 40 or another component of processor 38 or electronic control unit 22. PTX may be used by communication device 20 to transmit signals (e.g., via transmitter 32) at a power level below the maximum transmission power level of transmitter 32, thereby achieving the above-mentioned benefits.

In some situations, reliable measurements or determinations of the distance L between movable object 10 and second object 26 may not be available for determining PTX. When distance measurements are unavailable in situations where S/N and BLER measurements at second object 26 are also unavailable, another method of determining PTX may be needed.

Figure 5:
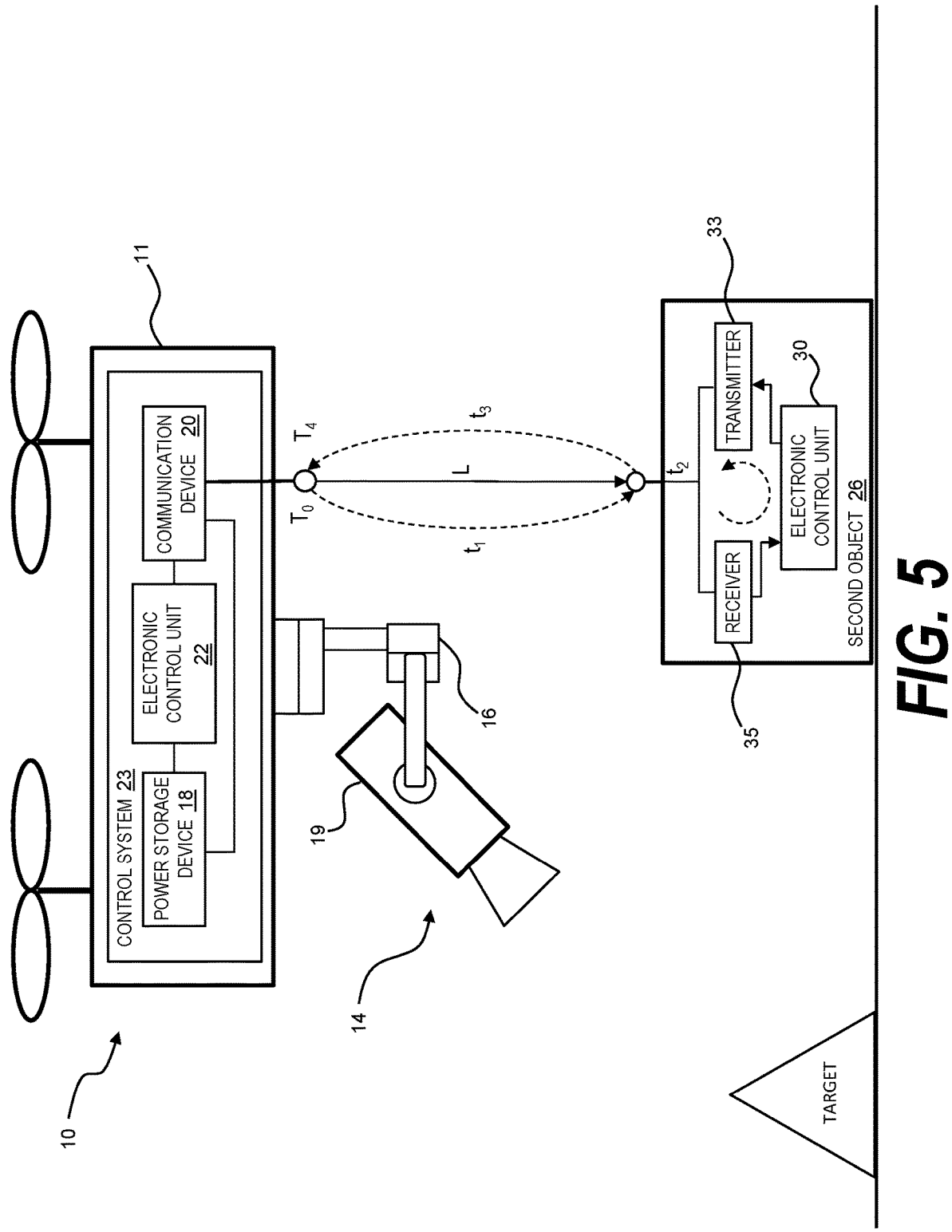
FIG. 5 is another schematic diagram of a system for controlling a transmission power of a wireless communication device of a movable object that may be used in accordance with another illustrative embodiment.

FIG. 5 shows an example in which movable object 10 may not be equipped with sensors or positioning equipment for measuring the distance L between movable object 10 and second object 26 or the height H of movable object 10 above the ground. Furthermore, second object 26 may not be equipped or configured to determine and/or transmit its actual S/N or BLER measurements to movable object 10.

In the example embodiment of FIG. 5, movable object 10 may be configured to determine the distance L between movable object 10 and second object 26 based on a time elapsed between a point in time $T_0$ at which a signal is sent to second object 26 and a point in time $T_4$ at which a return signal is received. This elapsed time period may be referred to as a "Round Trip Time" (RTT) and may be mathematically determined as the difference between measured times $T_4$ and $T_0$, i.e., $T_4 - T_0$. RTT may be broken down into multiple discrete elapsed time periods $t_1$, $t_2$, and $t_3$. As shown in FIG. 5, $t_1$ and $t_3$ may be represent the amount of time elapsed (i.e., transmission time) for a signal generated by movable object 10 to reach second object 26 and the time taken for a signal generated by second object 26 to reach movable object 10, respectively. In some circumstances, such as for line-of-sight communication with no obstructions and low relative speed between movable object 10 and second object, $t_1$ and $t_3$ may be assumed to be approximately equal. As also shown in FIG. 5, $t_2$ may represent the time required for second object 26 to process the signal received from movable object 10 and generate a return signal. Thus, RTT may be expressed as $RTT=T_4-T_0=t_1+t_2+t_3$.

Movable object 10 may be configured to track the absolute time corresponding to $T_0$ and $T_4$. For example, electronic control unit 22 may include a clock or a timer, and $T_0$ and $T_4$ may be tracked and stored within memory 36 for further processing. Second object 26 may be configured to measure $t_2$ by tracking the elapsed time between receiving the signal from movable object 10 and sending a return signal. For example, electronic control unit 30 may include or be in communication with a timer or other device configured to measure $t_2$. The return signal generated by second object 26 may be indicative of $t_2$, which can then be used by movable object 10 to determine the RTT. Alternatively, movable object 10 may be configured to estimate the time $t_2$ required for second object 26 to process a received signal, for example, based on a processing time previously determined by empirical, statistical, or simulation data, calculations, etc., and stored in memory 36. In some embodiments, the time $t_2$ may be estimated to equal a predetermined constant value.

Figure 6:
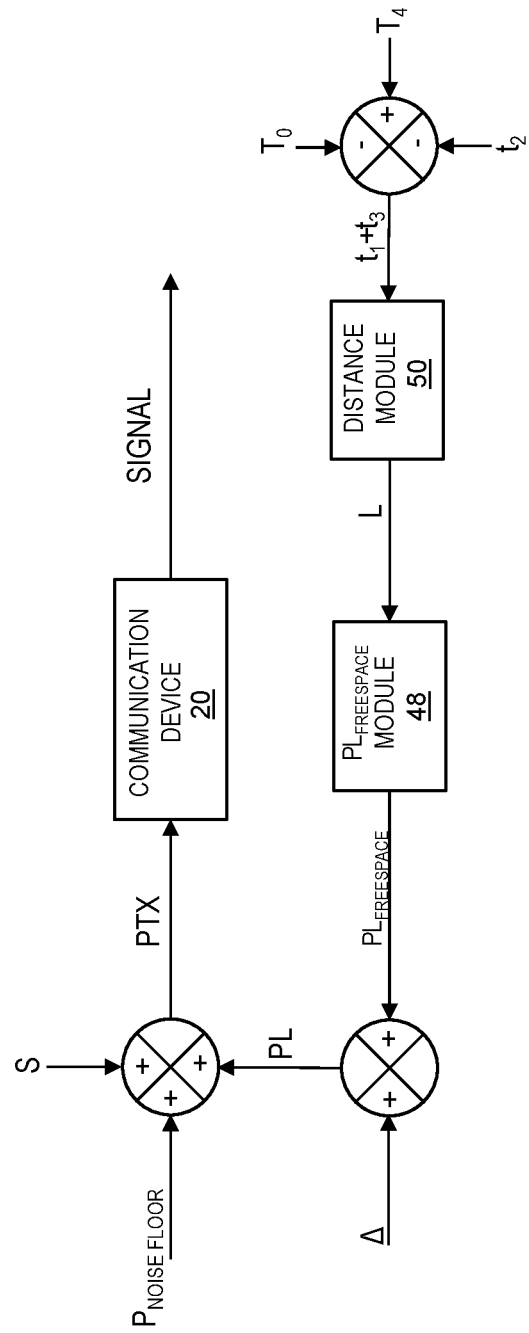
FIG. 6 shows a schematic block diagram of an exemplary method of controlling a transmission power of a wireless communication device in a movable object that may be used in accordance with the illustrative embodiment of FIG. 5.

As shown in FIG. 6, starting with the time $T_4$ and subtracting time $T_0$ (e.g., each of which may have been measured by a clock or timer in electronic control unit 22 and stored in memory 36 or obtained by other means such as from an external timing source) and also subtracting time $t_2$ (e.g., which may have been determined by electronic control unit 30 and transmitted to movable object 10) yields the combined elapsed time of $t_1+t_3$ (which corresponds to a total transmission time). The total transmission time of $t_1+t_3$ may be used to determine the distance L between movable object 10 and second object 26. For example, a distance module 50 may be configured to determine the distance L based on $t_1+t_3$ of the round trip time RTT. Distance module 50 may be implemented in hardware and/or software, such as a processor included within electronic control module 22 or computer-executable instructions stored within memory 36 and executable by processor 38 or its components. The distance L may be determined by distance module 50 based on the following expression:

$$L = c \times t_1 = c \times \frac{t_1+t_3}{2} = c \times \frac{T_4-T_0-t_2}{2} \quad \text{EQ 4}$$

In EQ 4 above, the constant c represents the speed of the signals traveling between movable object 10 and second object 26 (e.g., the speed of electromagnetic waves in air) and may be equal to $3\times10^8$ m/s. In some situations, such as when a line-of-sight (LOS) or direct-path propagation connection is possible between movable object 10 and second object 26, the elapsed times of $t_1$ and $t_3$ may be equal or approximately equal. When $t_1$ and $t_3$ are equal or approximately equal, the expression in EQ 4 can be written as $L=c \times t_1$ or $L=c \times t_3$. Distance module 50 may output the determined distance L to another module, such as $PL_{free\ space}$ module 48, for determining $PL_{free\ space}$. In some embodiments, $PL_{free\ space}$ and loss constant $\Delta$ may then be combined (e.g., by addition) to determine $PL_{total}$. As explained above, $PL_{total}$, $P_{noise\ floor}$, and desired signal power S may be combined (e.g., by addition) to determine the transmission power level PTX for transmitting signals from movable object 10 to second object 26. $PL_{total}$ and PTX may be calculated or otherwise determined by communication module 40 or another component of processor 38 or electronic control unit 22. PTX may be used by communication device 20 to transmit signals (e.g., via transmitter 32) at a transmission power level below the maximum power level of transmitter 32, thereby achieving the above-mentioned benefits.

Figure 7:
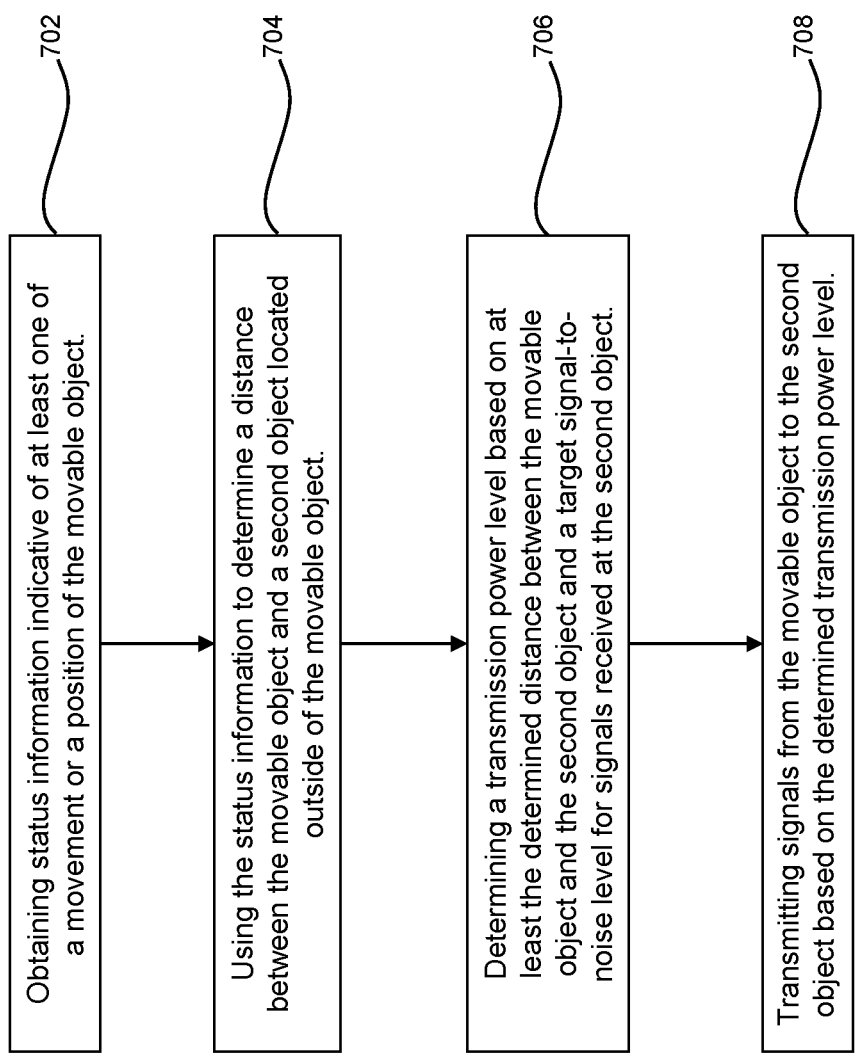
FIG. 7 shows a flowchart illustrating an exemplary sequence of steps that may be performed for controlling a transmission power of a wireless communication device in a movable object in accordance with the illustrative embodiment of FIG. 3.

FIG. 7 shows a sequence of steps that may be performed by an exemplary method 700 for determining a transmission power level at a movable object consistent with embodiments of this disclosure. Method 700 may include a step of obtaining status information indicative of at least one of a movement or a position of the movable object (step 702). For example, status information may include one or more of a speed, an acceleration, a heading, or a height (e.g., height above ground, altitude, etc.) of movable object 10, but is not limited thereto and may include other or additional information. Status information may be obtained via one or more sensors 44 or may include predetermined information (e.g., location information), as discussed above.

Method 700 may further include a step of using the status information to determine a distance between the movable object and a second object located outside of the movable object (step 704). For example, the status information, such as position or other location information, the height H of movable object 10, and/or the speed and heading of movable object 10 may be used to determine the distance L between movable objet 10 and second object 26.

Method 700 may further include a step of determining a transmission power level based on at least the determined distance between the movable object and the second object and a target signal-to-noise level for signals received at the second object (step 706). For example, communication module 40 may mathematically combine $P_{noise\ floor}+S+PL_{free\ space}+A$ according to EQ 3 above to determine PTX. The distance L (determined in step 704) may be used by communication module 40 to determine $PL_{free\ space}$ (as explained above), and thus PTX may be based at least on the distance L and the target signal-to-noise signal-power level S.

Method 700 may further include transmitting signals from the movable object to the second object based on the determined transmission power level (step 708). For example, after determining PTX in step 706, communication module 40 may be configured to convey the determined PTX value to communication device 20 or use the PTX value to drive transmitter 32 of communication device 20 to generate signals below the maximum transmission power level of transmitter 32.

Figure 8:
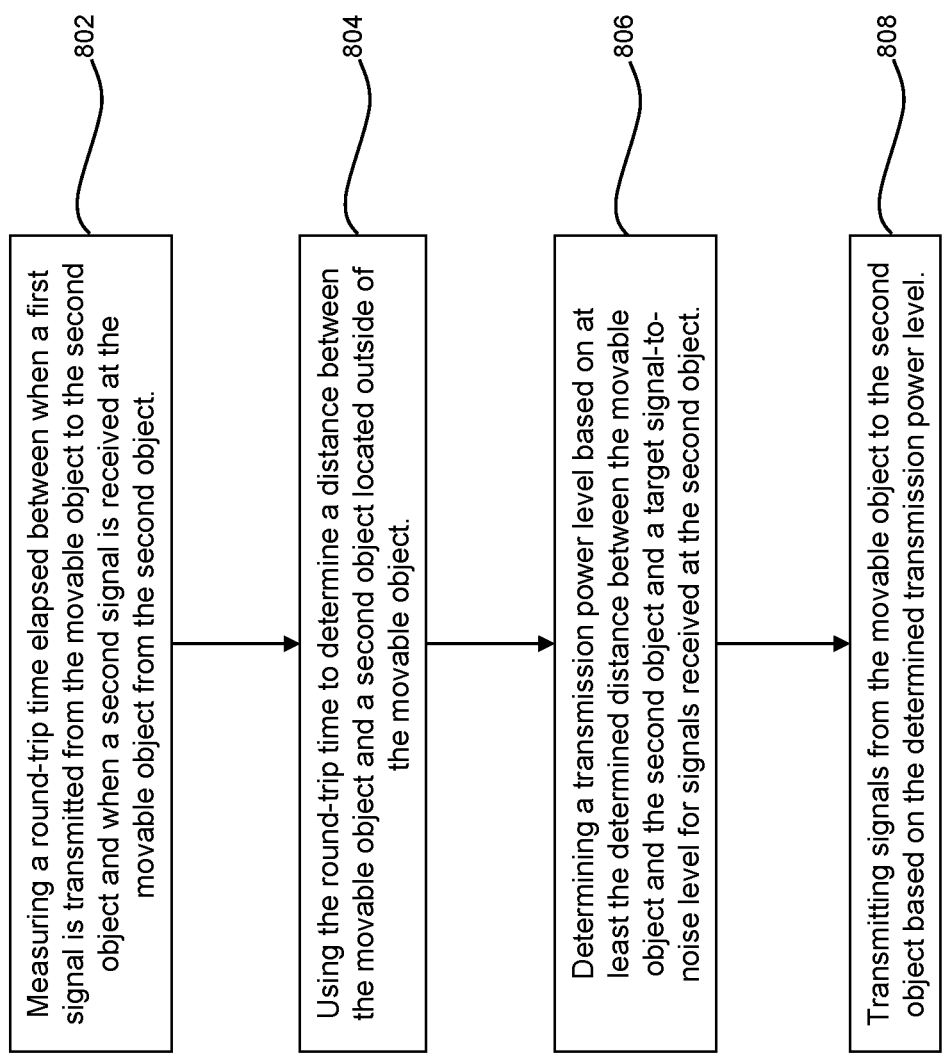
FIG. 8 shows a flowchart illustrating an exemplary sequence of steps that may be performed for controlling a transmission power of a wireless communication device in a movable object in accordance with the illustrative embodiment of FIG. 5.

FIG. 8 shows a sequence of steps that may be performed by an exemplary method 800 for determining a transmission power level from a movable object consistent with embodiments of this disclosure. Method 800 may include measuring a round-trip time elapsed between when a first signal is transmitted from the movable object to the second object and when a second signal is received at the movable object from the second object (step 802). For example, movable object 10 may store a time corresponding to when a first signal is transmitted from movable object 10 to second object 26 (e.g., $T_0$), for example using a time measured by a real-time clock or timer in the movable object 10 or based on a time obtained from a positioning system, such as GPS, or other timing source, and a time at which a second signal (e.g., a return signal) is received by movable object 10 from second object 26 (e.g., $T_4$), again measured by a clock or timer or otherwise obtained from a positioning system or other timing source. The difference between the measured times $T_4$ and $T_0$ may indicate the total round trip time RTT. In some embodiments, the elapsed time $t_2$ for processing the first signal by second object 26 may be tracked by second object and transmitted to movable object 10 via the second signal (i.e., the return signal). Communication module may subtract $t_2$ from the difference between $T_4$ and $T_0$ to determine the total transmission time (i.e., $t_1+t_3$) and divide the total transmission time by 2 to determine the one-way transmission time between movable object 10 and second object 26.

Method 800 may also include using the round-trip time to determine a distance between the movable object and a second object located outside of the movable object (step 804). For example, distance module 50 may determine the distance L between movable object 10 and second object 26 using on EQ 4 based on the round-trip time determination of step 802. Distance module 50 may output the determined distance L to another module, such as $PL_{free\ space}$ module 48, for determining $PL_{free\ space}$. In some embodiments, $PL_{free\ space}$ and loss constant $\Delta$ may then be combined (e.g., by addition) to determine $PL_{total}$.

Method 800 may further include a step of determining a transmission power level based on at least the determined distance between the movable object and the second object and a target signal-to-noise level for signals received at the second object (step 806). For example, communication module 40 may mathematically combine $P_{noise\ floor}+S+PL_{free\ space}+\Delta$ according to EQ 3 above to determine PTX. The distance L (determined in step 804) may be used by communication module 40 to determine $PL_{free\ space}$ (as explained above), and thus PTX may be based at least on the distance L and the target signal-to-noise signal-power level S.

Method 800 may further include transmitting signals from the movable object to the second object based on the determined transmission power level (step 808). For example, after determining PTX in step 806, communication module 40 may be configured to convey the determined PTX value to communication device 20 or use the PTX value to drive transmitter 32 of communication device 20 to generate signals below the maximum transmission power level of transmitter 32.

It will be apparent to those skilled in the art that various modifications and variations can be made to the disclosed methods and systems. Other embodiments will be apparent to those skilled in the art from consideration of the specification and practice of the disclosed methods and systems. For example, while the disclosed embodiments are described with reference to an exemplary movable object 10 and second object 26, those skilled in the art will appreciate the disclosure may be applicable in other wireless communication systems with different types of transmitting and receiving nodes. It is intended that the specification and examples be considered as exemplary only, with a true scope of the invention being indicated by the following claims and their equivalents.

What is claimed is:

1. A method of controlling a transmission power of a wireless communication device of a movable object, the method comprising:
   determining a distance between the movable object and a target object located outside of the movable object;
   determining a transmission power level based on at least the determined distance between the movable object and the target object and a target signal-to-noise level for signals received at the target object; and
   transmitting signals from the movable object to the target object based on the determined transmission power level.

2. The method of claim 1, wherein determining the distance between the movable object and the target object comprises:
   obtaining status information indicative of at least one of a movement or a position of the movable object; and
   using the status information to determine the distance between the movable object and the target object.

3. The method of claim 2, wherein the status information includes one or more of a speed, an acceleration, a heading, or a height of the movable object.

4. The method of claim 1, wherein the distance between the movable object and the target object is based further on a measured height obtained using a sensor of the movable object.

5. The method of claim 1, further comprising:
   measuring a round-trip time elapsed between when a first signal is transmitted from the movable object to the target object and when a second signal is received at the movable object from the target object; and
   determining the distance between the movable object and the target object based on the measured round-trip time.

6. The method of claim 1, wherein determining the transmission power level further comprises calculating a free-space path loss level based on the determined distance between the movable object and the target object, and determining the transmission power level based on the calculated free-space path loss level.

7. The method of claim 6, wherein determining the transmission power level further comprises:
   determining a path-loss level based on the calculated free-space path loss level and a constant; and
   determining the transmission power level based on the path-loss level, a noise-floor power level, and the target signal-to-noise level.

8. A system for controlling a transmission power of a wireless communication device of a movable object, the system comprising:
   a memory having instructions stored therein; and
   an electronic control unit having a processor configured to execute the instructions to:
     determine a distance between the movable object and a target object located outside of the movable object;
     determine a transmission power level based on at least the determined distance between the movable object and the target object and a target signal-to-noise level for signals received at the target object; and
     transmit signals from the movable object to the target object based on the determined transmission power level.

9. The system of claim 8, wherein the processor is further configured to execute the instructions to:
   obtain status information indicative of at least one of a movement or a position of the movable object; and
   determine the distance between the movable object and a target object using the status information.

10. The system of claim 8, wherein the processor is further configured to execute the instructions to:
    measure a round-trip time elapsed between when a first signal is transmitted from the movable object to the target object and when a second signal is received at the movable object from the target object; and
    determine the distance between the movable object and the target object based on the measured round-trip time.

11. The system of claim 8, wherein the processor is further configured to execute the instructions to calculate a free-space path loss level based on the determined distance between the movable object and the target object, and determine the transmission power level based on the calculated free-space path loss level.

12. The system of claim 11, wherein the processor is further configured to execute the instructions to:
- determine a path-loss level based on the calculated free-space path loss level and a constant; and
- determine the transmission power level based on the path-loss level, a noise-floor power level, and the target signal-to-noise level.

13. An unmanned aerial vehicle (UAV), comprising:
a communication device;
a power storage device configured to power the communication device;
a memory storing instructions; and
an electronic control unit in communication with the communication device and configured to control a transmission power of the communication device, the controller comprising a processor configured to execute the instructions to:
- determine a distance between the movable object and a target object located outside of the movable object;
- determine a transmission power level based on at least the determined distance between the movable object and the target object and a target signal-to-noise level for signals received at the target object; and
- transmit signals from the movable object to the target object based on the determined transmission power level.

14. The UAV of claim 13, wherein the processor is further configured to execute the instructions to:
- obtain status information indicative of at least one of a movement or a position of the movable object; and
- determine the distance between the movable object and a target object using the status information.

15. The UAV of claim 14, wherein the status information includes:
- global positioning system (GPS) coordinates of the movable object or the target object, or
- one or more of a speed, an acceleration, a heading, or a height of the movable object.

16. The UAV of claim 13, wherein the processor is further configured to execute the instructions to:
- measure a round-trip time elapsed between when a first signal is transmitted from the movable object to the target object and when a second signal is received at the movable object from the target object; and
- determine the distance between the movable object and the target object based on the measured round-trip time.

17. The UAV of claim 13, wherein the processor is further configured to execute the instructions to calculate a free-space path loss level based on the determined distance between the movable object and the target object, and determine the transmission power level based on the calculated free-space path loss level.

18. The UAV of claim 17, wherein the processor is further configured to execute the instructions to:
- determine a path-loss level based on the calculated free-space path loss level and a constant; and
- determine the transmission power level based on the path-loss level, a noise-floor power level, and the target signal-to-noise level.

19. The UAV of claim 13, further comprising a propulsion device powered by the power storage device.

* * * * *